(12) United States Patent
Samarasekera et al.

(10) Patent No.: US 9,734,414 B2
(45) Date of Patent: Aug. 15, 2017

(54) UNIFIED FRAMEWORK FOR PRECISE VISION-AIDED NAVIGATION

(71) Applicant: SRI International, Menlo Park, CA (US)

(72) Inventors: Supun Samarasekera, Princeton, NJ (US); Rakesh Kumar, West Windsor, NJ (US); Taragay Oskiper, East Windsor, NJ (US); Zhiwei Zhu, Plainsboro, NJ (US); Oleg Naroditsky, Princeton, NJ (US); Harpreet Sawhney, Princeton Junction, NJ (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 14/835,080

(22) Filed: Aug. 25, 2015

(65) Prior Publication Data

US 2016/0078303 A1 Mar. 17, 2016

Related U.S. Application Data

(63) Continuation of application No. 13/451,037, filed on Apr. 19, 2012, now Pat. No. 9,121,713, which is a (Continued)

(51) Int. Cl.
*G06K 9/00* (2006.01)
*G01C 21/00* (2006.01)
(Continued)

(52) U.S. Cl.
CPC ............ *G06K 9/00791* (2013.01); *B60R 1/00* (2013.01); *G01C 21/005* (2013.01); (Continued)

(58) Field of Classification Search
CPC .... G06K 9/00791; G06K 9/52; G06K 9/6215; G06K 9/4642; G06K 9/3216; B60R 1/00; (Continued)

(56) References Cited

U.S. PATENT DOCUMENTS 6,028,672 A * 2/2000 Geng .................. G01B 11/022
250/237 G
7,003,134 B1 2/2006 Covell et al.
(Continued)

OTHER PUBLICATIONS

D. Nister, et al., "Visual Odometry", Proc. IEEE Conference on Computer Vision and Pattern Recognition, vol. 1, Issue 24, pp. I-652-I-659 (2004).

*Primary Examiner* — John B Walsh
(74) *Attorney, Agent, or Firm* — Moser Taboada

(57) ABSTRACT

A system and method for efficiently locating in 3D an object of interest in a target scene using video information captured by a plurality of cameras. The system and method provide for multi-camera visual odometry wherein pose estimates are generated for each camera by all of the cameras in the multi-camera configuration. Furthermore, the system and method can locate and identify salient landmarks in the target scene using any of the cameras in the multi-camera configuration and compare the identified landmark against a database of previously identified landmarks. In addition, the system and method provide for the integration of video-based pose estimations with position measurement data captured by one or more secondary measurement sensors, such as, for example, Inertial Measurement Units (IMUs) and Global Positioning System (GPS) units.

20 Claims, 6 Drawing Sheets

Related U.S. Application Data continuation of application No. 11/949,433, filed on Dec. 3, 2007, now Pat. No. 8,174,568.

(60) Provisional application No. 60/868,227, filed on Dec. 1, 2006.

(51) Int. Cl.
| | | |
|---|---|---|
| *G01C 21/16* | (2006.01) | |
| *G06K 9/32* | (2006.01) | |
| *B60R 1/00* | (2006.01) | |
| *G06K 9/46* | (2006.01) | |
| *G06K 9/52* | (2006.01) | |
| *G06K 9/62* | (2006.01) | |
| *H04N 13/02* | (2006.01) | |
| *G06T 7/73* | (2017.01) | |
| *H04N 13/00* | (2006.01) | |

(52) U.S. Cl.
CPC ......... *G01C 21/165* (2013.01); *G06K 9/3216* (2013.01); *G06K 9/4642* (2013.01); *G06K 9/52* (2013.01); *G06K 9/6215* (2013.01); *G06T 7/74* (2017.01); *H04N 13/0239* (2013.01); *H04N 2013/0081* (2013.01)

(58) Field of Classification Search
CPC ........ H04N 13/0239; H04N 2013/0081; G06T 7/0044; G01C 21/005; G01C 21/165
See application file for complete search history.

(56) References Cited

U.S. PATENT DOCUMENTS

| | | |
|---|---|---|
| 7,031,497 B2 | 4/2006 | Trajkovi |
| 9,121,713 B2 * | 9/2015 | Samarasekera ...... G01C 21/005 |
| 2004/0076324 A1 | 4/2004 | Burl et al. |
| 2004/0168148 A1 | 8/2004 | Goncalves et al. |
| 2006/0013450 A1 | 1/2006 | Shan et al. |

\* cited by examiner

An exemplary histogram computation of the 3D landmark distributions

UNIFIED FRAMEWORK FOR PRECISE VISION-AIDED NAVIGATION

CROSS-REFERENCE TO RELATED APPLICATIONS

This application is a continuation of co-pending U.S. patent application Ser. No. 13/451,037 filed Apr. 19, 2012, which is a continuation of co-pending U.S. patent application Ser. No. 11/949,433 filed Dec. 3, 2007 (now U.S. Pat. No. 8,174,568 issued May 8, 2012), which claims the benefit of U.S. Provisional Patent Application 60/868,227 filed Dec. 1, 2006, all of which are herein incorporated by reference in their entireties.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. M67854-05-C-8006 awarded by the Office of Naval Research.

FIELD OF THE INVENTION

The present invention relates generally to visual odometry, particularly to a system and method for enhanced route visualization in mission planning applications.

BACKGROUND OF THE INVENTION

Precise and efficient navigation systems are very important for many applications involving location identification, route planning, autonomous robot navigation, unknown environment map building, etc. However, most of the available navigation systems do not function efficiently and fail frequently under certain circumstances.

For example, GPS (Global Positioning System) is a widely used navigation system. However, GPS is limited in that it cannot work reliably once the satellite signals are blocked or unavailable in, for example, "GPS-denied" environments such as indoors, forests, urban areas, etc. Even when operating properly, GPS can only provide the location of the user, which is not sufficient to assist the user during navigation. For example, when a group of military personnel are performing a military operation in an unknown environment, it is desirable to determine not only the location of each member of the unit, but also identify what each user in the group is seeing, where they are looking (i.e., whether they are viewing a region or target of interest, and the movement and/or direction of the user's visual perspective), and any other activity and happenings in the scene. In addition, it is highly desirable to have a system wherein the individual members of the team are able to share visual and navigational information with one another.

In addition, conventional systems including multiple cameras or other visual sensing devices provide for limited ability to perform comprehensive visual odometry. Specifically, in such systems, visual odometry can be applied to each camera individually to estimate the pose of that camera. As such, the relative poses of the cameras (i.e., a camera's pose relative to the other cameras in the system) are fixed and known, which constrains the single-camera results. In this regard, conventional navigation systems provide for the generation of camera pose hypotheses that are based exclusively on data which is specific to the individual camera, and does not take into account the data processed by the other camera's in the multi-camera system.

Therefore, there is a need for a method and a system for efficiently and effectively determine navigational information using a multi-camera system.

SUMMARY OF THE INVENTION

The above-described problems are addressed and a technical solution is achieved in the art by a system and method for providing real-time capture of visual sensor data. According to an embodiment of the present invention, a vision-based navigation system is provided which can identify the 3D coordinates (i.e., determine a location in 3D) of an object of interest (e.g., a person, vehicle, building, etc.) with a local reference coordinate system in a GPS-denied or GPS-challenged environment. In this regard, the vision-based navigation system and method of the present invention can use sparse GPS readings and landmark information from the environment to geo-locate an object of interest (e.g., a person, vehicle, etc.) in 3D.

According to the an embodiment of the present invention, the systems and methods are configured to independently estimate the position and 3D orientation accurately by using only video images (e.g., image streams) captured from one, two or more inexpensive video cameras. The system, just as would a human, is able to track features in the environment over time to localize the position and gaze of the sensor system in 3D. The system is generally illustrated in FIG. 1, which shows a number of users equipped with video cameras configured to track features (e.g., trees, vehicles, buildings) in a target scene.

Moreover, the vision-based navigation system according to an embodiment of the present invention can be integrated with one or more secondary measurement sensors, such as, for example, an inertial measurement unit (IMU), GPS unit, and/or suitable rigidly mounted video sensors to improve localization accuracy and robustly determine both the location and the 3D gaze or orientation of the user under a wide range of environments and situations.

According to an embodiment of the present invention, the systems and methods are configured to integrate video-based pose estimates based on video captured by one or more video cameras; position measurement data captured by one or more secondary measurement sensors, such as, for example, IMUs and GPS units. The position measurement data may include, for example, 3D acceleration and angular rate measurements captured by an IMU and/or a positioning reading captured by GPS. The integrated information may be used to generate a refined pose estimation and is adapted to detect outliers and failures in the video component or secondary measurement sensor components of the system.

According to an embodiment of the present invention, a framework is provided which improves visual odometry performance by recognizing previously visited locations and using information related to the previous visits to correct drift accumulated during navigation. Specifically, at each traveled location along a route, a set of distinctive visual landmarks is automatically extracted from the target scene and inserted dynamically into a landmark database. As the user travels to a new location, a new set of visual landmarks is extracted from the scene and the landmark database searched for their possible matches. Using the previously identified and recognized visual landmarks during location re-visits, an improved pose correction technique is provided which can significantly reduce or eliminate the accumulated navigation drift.

According to an embodiment of the invention, a real-time multi-camera based visual odometry can locate an individual or other target object with precision, for example, within 1 meter over 1 km in an unknown environment.

Additionally, the systems and methods of the present invention are configured to record detailed information and imagery associated with an environment in real-time. The stored information and imagery can be shared and analyzed to assist the user in reporting specific information regarding what the user is viewing, herein referred to as the "user viewpoint."

FIG. 2 illustrates an exemplary screenshot from a display communicatively connected to the vision-based navigation system of the present invention. As shown, as a user equipped with the vision-based navigation system travels through the environment, his or her position and viewpoint can be located precisely in the map, preferably in a real-time manner, as shown in the image in the upper right of FIG. 2. In addition, the user viewpoint (i.e., what is seen from the user's perspective and location) in the context of a larger environment is denoted by the shaded triangular shaped portion of the image on the left hand side of the screenshot shown in FIG. 2.

The video images captured by the user are fed to an image processing system configured to analyze the images and detects objects of interest, such as, for example, vehicles and people. The location(s) of the one or more objects of interest are recorded in a database and can be identified in a map of the environment. The video data and estimated pose information are stored in a database, preferably in real-time, and can be played and processed off-line to assist in planning and implementing future navigation tasks, mission reporting and mission rehearsal.

According to an embodiment of the present invention, a global landmark recognition system and method are provided which can locate salient landmarks in the environment from any one video sensor and match the identified landmark against previously identified landmarks stored in a database (herein referred to as the "landmark database"). The previously identified landmarks, which were extracted from video at a different point in time (same or different video sensor), can be used to correlate the position information with respect to a global coordinate system maintained by the landmark database.

Advantageously, according to an embodiment, the systems and methods of the present invention are configured for efficient extract and store landmarks and related information in the landmark database over a long sequence. Subsequently, the stored landmarks can be matched with landmarks detected in real-time by a user operating a wearable vision-based navigation system illustrated in FIG. 3.

The present invention further relates to a system and method for landmark recognition. According to an embodiment of the invention, the system and method are configured to receive from a video camera a video snapshot comprising a pair of stereo images (i.e., a right image and a left image) related to a target scene. Next, a set of natural feature points (in 2D) are extracted from the right and left images. Once the 2D feature points are extracted, a stereo matching algorithm is activated to identify correspondences among the extracted set of feature points between the right and left images. The 3D coordinates of each feature point are computed according to any suitable method known in the art, thereby producing a representation of the landmark. The 2D and 3D coordinates of the feature(s) are herein referred to as the "spatial configuration data."

After the one or more landmarks have been detected from the stereo pair, a histogram of oriented gradients (HOG) descriptor is computed based on at least a portion of the stereo image pair. According to an embodiment of the present invention, instead of computing the HOG descriptor with a fixed scale to select the image patch size, as in conventional methods, here, the HOG descriptor is computed with a depth-dependent scale. The depth-dependent scale from the stereo images is used to define a scale for the landmarks to make the features highly robust.

The HOG descriptor (i.e., a fixed scale or depth-dependent scale HOG descriptor) is associated with the landmark to produce a "landmark snapshot." According to an embodiment of the present invention, the landmark snapshot may comprise the associated HOG descriptor along with the spatial configuration data (i.e., the 2D and 3D coordinates related to the one or more features).

According to an embodiment of the present invention, given two images taken at different locations, landmarks can be extracted from the images and matched using the HOG descriptors. In one embodiment, the landmark matching is implemented as a very efficient pipeline that utilizes spatio-temporal distribution of the points to prune candidate pose hypothesis for matching. In addition, the landmark matching can be used to correlate routes and locations with a mission and between multiple missions. Similar routes taken by multiple soldiers can be correlated together though the matching process.

BRIEF DESCRIPTION OF THE DRAWINGS

The present invention will be more readily understood from the detailed description of exemplary embodiments presented below considered in conjunction with the attached drawings, of which.

Figure 1:
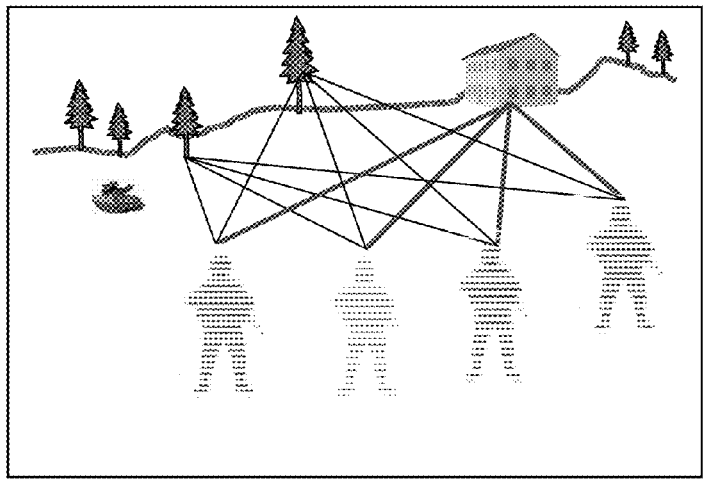
FIG. 1 illustrates an exemplary environment for use of the vision-based navigation systems and methods according to embodiments of the present invention.
Figure 2:
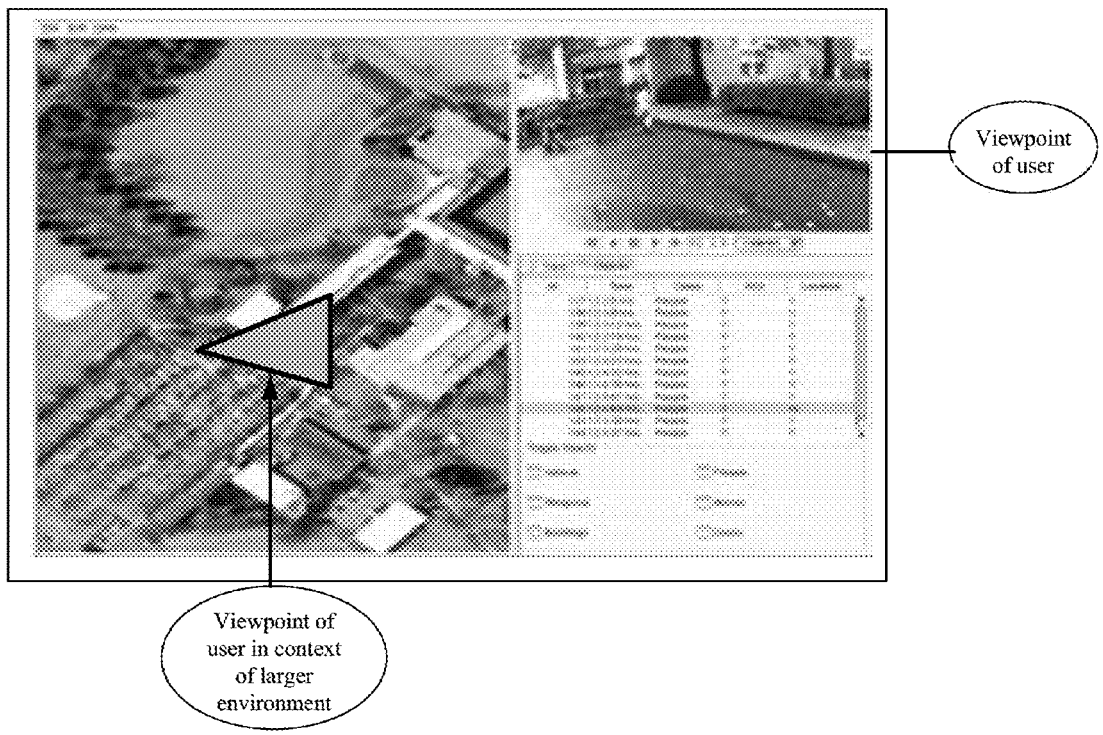
FIG. 2 illustrates an exemplary screenshot generated by the vision-based navigation systems and methods of the present invention.

It is to be understood that the attached drawings are for purposes of illustrating the concepts of the invention and may not be to scale.

DETAILED DESCRIPTION OF THE INVENTION

The present invention relates to vision-based navigation systems and methods for determining location and navigational information related to a user and/or other object of interest. An overall system and functional flow diagram according to an embodiment of the present invention is shown in FIG. 4. The systems and methods of the present invention provide for the real-time capture of visual data using a multi-camera framework and multi-camera visual odometry (described below in detail with reference to FIGS. 3, 5, and 6); integration of visual odometry with secondary measurement sensors (e.g., an inertial measurement unit (IMU) and/or a GPS unit) (described in detail with reference to FIGS. 3); global landmark recognition including landmark extraction, landmark matching, and landmark database management and searching (described in detail with reference to FIGS. 3, 7, 8, and 9).

As shown in FIG. 4, the vision-based navigation system 1 (herein referred to as the "Navigation System") according to an embodiment of the present invention comprises a plurality of video sensors (e.g., cameras) 10 herein referred to a "Camera Cluster" or "plurality of cameras"; a Visual Odometry Module 20; an Integration Module 30; a Landmark Extractor 40; a Landmark Matcher 50; and a Landmark Database 60. The components of the Navigation System 1 may be comprised of, accessible by, or implemented by one or more computers and related computer-executable programs. The term "computer" is intended to include any data processing device, such as a desktop computer, a laptop computer, a mainframe computer, a personal digital assistant, a server, a handheld device, or any other device able to process data. The communicative connections, inter-operation, and functionality of each component of the Navigation System 1 is described in detail below. The terms "communicative connection" and "communicatively connected" are intended to include any type of connection, whether wired or wireless, in which data may be communicated. The term "communicatively connected" is intended to include a connection between devices and/or programs within a single computer or between devices and/or programs on separate computers.

With reference to FIG. 4, the Camera Cluster 10 comprises a plurality of video sensors (e.g., cameras) configured to capture video related to an environment, herein referred to as the "target scene." The target scene may comprise one or more features, including, but not limited to, people, vehicles, buildings, etc. Each of the plurality of cameras is configured to capture video from that camera's perspective, herein referred to as a "local camera capture."

The captured video from each of the cameras is provided by the Camera Cluster 10 to the Visual Odometry Module 20, as shown in FIG. 4. The Visual Odometry Module 20 is a computer-based program configured to perform multi-camera visual odometry wherein pose information is transferred across different cameras of the Camera Cluster 10 such that video-based pose hypotheses generated by each camera can be evaluated by the entire system. In operation, a set of pose hypotheses (also referred to as pose candidates) are generated by each camera in the Camera Cluster 10 based on an evaluation of the local camera capture against a local dataset (i.e., the dataset of the local camera). In addition, each set of pose hypotheses is transferred to and evaluated by the other cameras in the Camera Cluster 10, resulting in the evaluation of the each camera's pose hypotheses on a global dataset and enabling the robust selection of an 'optimized' pose.

In order for the multi-camera visual odometry method of the present invention to be performed, a pose transfer mechanism is provided which transfers each camera's pose to all of the other cameras in the Camera Cluster 10. The pose transfer or transformation process is described in greater detail below in the context of an example wherein the Camera Cluster 10 includes 2 cameras (referred to as "Camera j" and "Camera k"). One having ordinary skill in the art will appreciate that the example including two cameras is intended for illustrative purposes, and that systems having greater than two cameras are within the scope of the present invention.

According to an embodiment of the present invention, the pose (P) of Camera j in the world at time t may be represented by a rotation matrix $R_{wj}(t)$ and a translation vector $T_w^j(t)$ that map the world point $x_w$ to the camera point $x_j$:

$$X_j = R_{wj}(t)X_w + T_w^j(t). \quad \text{(Equation 1)}$$

This transformation can also be expressed as $$\begin{pmatrix} X_j \\ 1 \end{pmatrix} = P_{wj}(t) \begin{pmatrix} X_w \\ 1 \end{pmatrix},$$

where $P_{wj}(t) = \begin{pmatrix} R_{wj}(t) & T_w^j(t) \\ 0 & 1 \end{pmatrix}$

Similarly, the pose (P) of Camera k relative to Camera j can be expressed as $P_{jk}$, such that:

$$\begin{pmatrix} X_k \\ 1 \end{pmatrix} = P_{jk} \begin{pmatrix} X_j \\ 1 \end{pmatrix}. \quad \text{(Equation 2)}$$

According to an embodiment of the present invention, it may be assumed that both the intrinsic calibration parameters and the relative poses $P_{jk}$ between every camera pair on the rig are available through an initial calibration. The relationship can be expressed as $P_{jk}=P_{wk}(t)P_{jw}(t)$, which is assumed fixed in time, by expressing the same world point in terms of Camera j and Camera k coordinates. As such, $P_{jw}(t)=P_{wj}^{-1}(t)$. Then, assuming $P_{wj}(t)$ and $P_{jk}$ are known, the relationship can be expresses as follows:

$$P_{wk}(t)=P_{jk}P_{wj}(t). \quad \text{(Equation 3)}$$

According to a single mono or stereo visual odometry algorithm, at time step $t_1$, the camera pose for Camera j the coordinate system of that camera at time $t_0$ can be obtained, and denoted as $P_j(t_0,t_1)$, the matrix which transforms coordinates for Camera j at time $t_0$ to coordinates for Camera j at time $t_1$. As such, the relationship may be expressed as follows:

$$P_j(t_0,t_1)=P_{wj}(t_1)P_{jw}(t_0) \quad \text{(Equation 4)}$$

Given $P_j(t_0,t_1)$ and the relative pose $P_{jk}$, the transformation matrix $P_k(t_0,t_1)$ may be computed according to the following expressions:

$$P_k(t_0, t_1) = P_{wk}(t_1)P_{kw}(t_0) \quad \text{(Equation 5)}$$
$$= P_{jk}P_{wj}(t_1)P_{jw}(t_0)P_{jk}^{-1}$$
$$= P_{jk}P_j(t_0, t_1)P_{kj}.$$

In terms of the rotation matrix R and translation vector T, this result can be written as:

$$R_k(t_0,t_1) = R_{jk}R_j(t_0,t_1)R_{kj}, \quad \text{(Equation 6)}$$

$$T_k(t_0,t_1) = R_{jk}R_j(t_0,t_1)T_k^j + T_j^k + R_{jk}T_j(t_0,t_1). \quad \text{(Equation 7)}$$

where $$T_j^k = -R_{jk}T_k^j.$$

According to an embodiment of the present invention, the above relationship for cameras that are rigidly connected on a fixed platform (rig) with a known configuration allows for the determination of the poses of all the cameras constrained by any given single camera pose.

With reference to FIG. 4, the Visual Odometry Module 20 receives captured video from each of the cameras in the Camera Cluster 10 (in this example, Camera j and Camera k) and performs feature detection and tracking, independently in each camera, as described in an article titled "Visual Odometry," by D. Nister, et al., in *Proc. IEEE Conference on Computer Vision and Pattern Recognition*, Volume 1, Issue 27, Pages I-652-I-659 (2004), the entire contents of which are hereby incorporated by reference herein. The feature detection and tracking involve extraction of multiple key points in each video frame for all the cameras in the system and finding matches between the frames. According to an embodiment of the present invention, 'Harris corners' may be identified according to the Harris Corner Extraction process, a technique well-known in the art. However, one having ordinary skill in the art will appreciate that any feature which describes an image point in a distinctive manner can be used. Each feature correspondence establishes a feature track, which lasts as long as the feature remains matched in the new frames that are acquired in the video sequence. As old tracks vanish, new ones are established with features that have not been previously observed. The feature tracks for each camera are provided into a program and/or module configured to perform a pose estimation process.

Based on the feature tracks, pose hypotheses are generated according to a multi-camera preemptive RANSAC method, described in detail herein. In the following section, the multi-camera preemptive RANSAC method is described for a multi-camera monocular system. One having ordinary skill in the art will appreciate that a multi-stereo system behaves much like the same way, except that, for relative pose calculations a 5-point algorithm over three views is performed in the monocular scheme, whereas a 3-point algorithm is performed in the stereo scheme using the 3D point cloud determined by stereo triangulation.

According to an embodiment of the invention, the preemptive RANSAC process is applied to a monocular visual odometry system. Using randomly selected 5 point correspondences over three views, N number of pose hypotheses (by default N=500) are generated using the 5-point algorithm, wherein each pose hypothesis consists of the pose of the second and third view with respect to the first view. Then, starting with all the pose hypotheses (also referred to as video-based pose hypotheses), they are evaluated on sets of M data points based on trifocal Sampson error (by default M=100), each time dropping out half of the least scoring hypotheses. Thus, the initial set of hypotheses includes 500 pose hypotheses, all of which are evaluated on a subset of 100-point correspondences (i.e., the local dataset). Next, the pose hypotheses are sorted according to their scores based on the local dataset, and the bottom half (i.e., the half having the lowest scores) is discarded.

In the next step, a set local dataset including 100 data points is selected on which the remaining 250 pose hypotheses are evaluated and the least scoring half are pruned and so forth until a single best-scoring hypothesis remains. One having ordinary skill in the art will appreciate that the numbers (i.e., the size of the local data subsets, the initial number of pose hypotheses, the number discarded per iteration) provided above are intended merely for illustrative purposes, and that other numbers may be used and are within the scope of the present invention. The stereo case is very similar to the above, except a 3-point resection algorithm over randomly chosen 3 point correspondences between 3D world points (obtained by stereo triangulation) and 2D image points is used to generate the pose hypotheses, and a robust cost function of reprojection errors is used in during the scoring phase.

Figure 5:
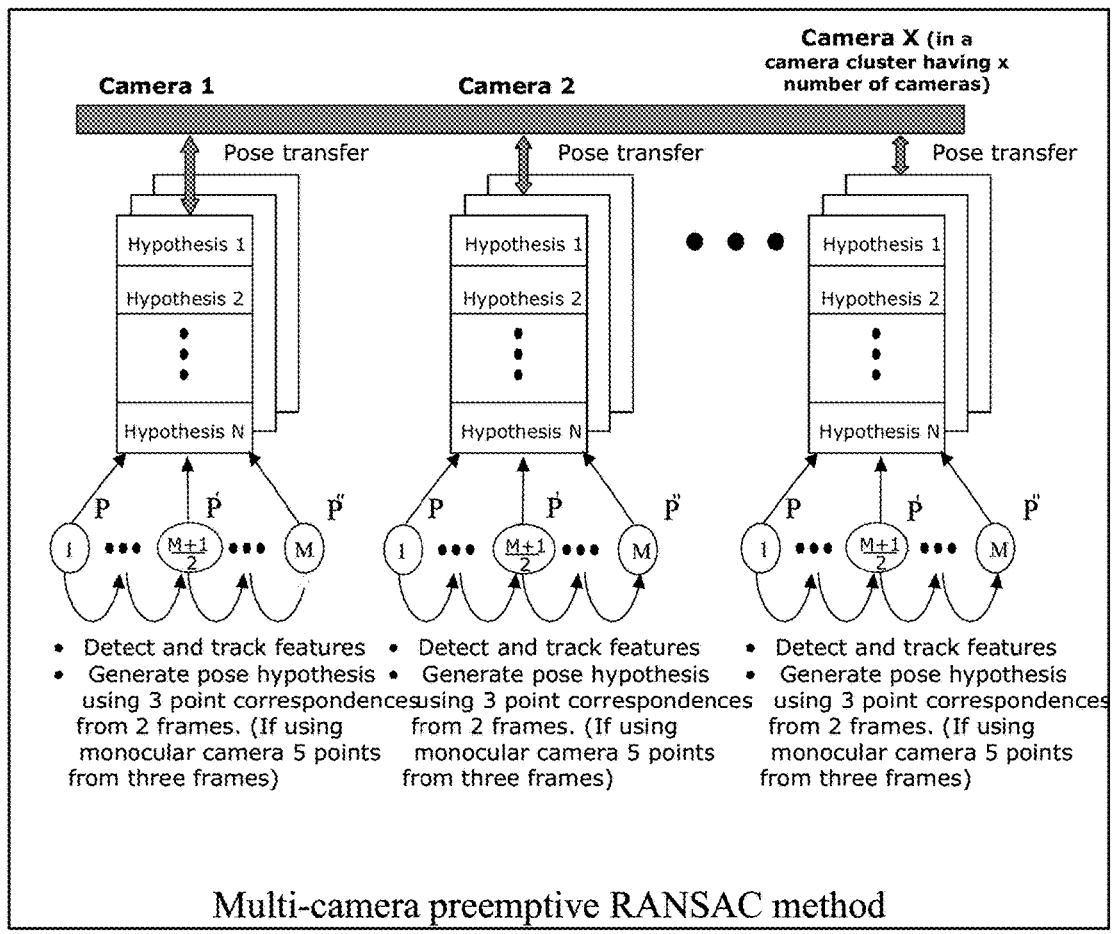
FIG. 5 illustrates a functional flow diagram related to a multi-camera preemptive Random Sample Consensus (RANSAC) system and process, according to an embodiment of the present invention.

FIG. 5 illustrates a multi-camera preemptive RANSAC process, according to an embodiment of the present invention. For a multi-camera system, as described above, each camera independently generates 500 pose hypotheses that are based on randomly selected 5 point correspondences using its own data. However, the pose hypotheses generated by each camera are evaluated not only on the data of the camera that generated them (herein the "local dataset") but their transformations (described in detail above) are also evaluated based on each of the rest of the cameras in the system, after they have been transformed properly throughout the system. In this regard, the pose estimations generated by each camera may be scored on a "global" dataset, i.e., the data maintained by the other cameras in the system. Accordingly, an "intra-camera score" is determined based on an evaluation of the pose estimation against its own local dataset. Furthermore, each pose is transformed according to the pose transfer relationship expressed in Equation 5 above, and scored on every other camera's local dataset in the multi-camera system to generate one or more "intra-camera scores").

The preemptive scoring in each camera is accomplished by obtaining a "global" score for each hypothesis by combining its corresponding scores determined in all the cameras (i.e., the intra-camera score and the one or more inter-camera scores) on the initial set of 100 data points from each camera. Next, a portion of the set of pose hypotheses having the lowest global scores (e.g., half of the initial set) are discarded and the remaining half is evaluated on another set of 100 points in every camera. The global scores are updated, and the process continues iteratively until an optimized pose hypothesis is identified. Upon completion of the multi-camera preemptive RANSAC process, the pose hypothesis having the highest global score is identified in each camera (herein referred to as the optimized pose hypothesis).

According to an embodiment of the present invention, the multi-camera preemptive RANSAC process may include the selection of 5 points across different cameras to compute the initial set of pose hypotheses. This is in contrast to the embodiment described above wherein the 5-point correspondences are selected in each camera individually. Implementing an algorithm that selects these point matches from different cameras and solves for the entire system pose satisfying those constraints further enhances the performance of the system by taking direct advantage of the wide field of view provided by the multi-camera system.

Figure 6:
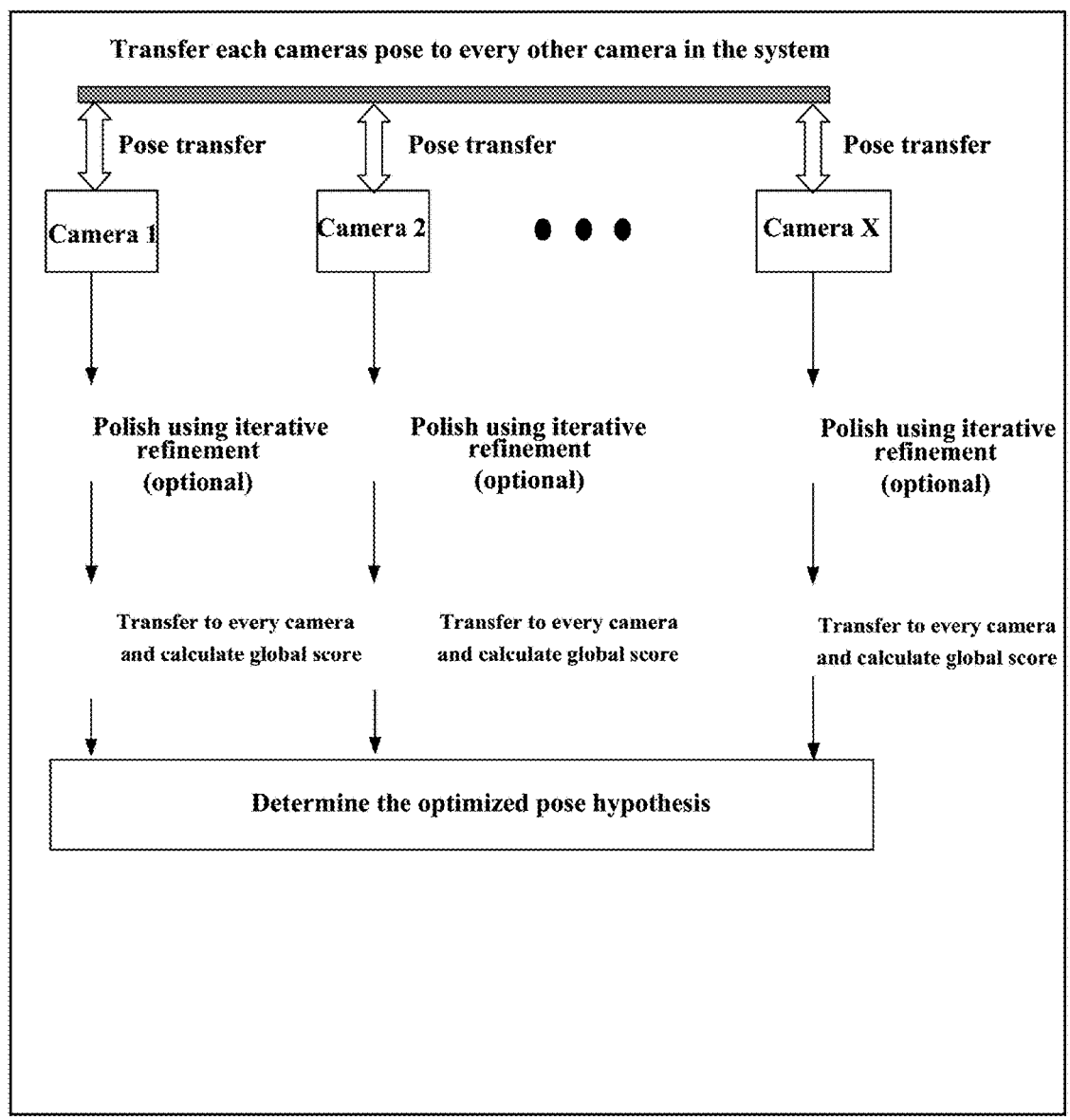
FIG. 6 illustrates a functional flow diagram related to a multi-camera pose refinement system and process, according to an embodiment of the present invention.

Following identification of the optimized pose hypothesis for each camera, the Visual Odometry Module 20 performs a multi-camera pose refinement process on the said hypotheses, as shown in FIG. 6. In both the monocular and stereo visual odometry algorithms, the best pose for that camera at the end of the preemptive RANSAC routine is passed to a pose refinement (polishing) step where iterative minimization of a robust cost function (derived from Cauchy distribution) of the reprojection errors is performed using the known Levenberg-Marquardt method, as described in "Visual Odometry," by D. Nister, et al., in *Proc. IEEE Conference on Computer Vision and Pattern Recognition, Volume* 1, Issue 27, Pages I-652-I-659 (2004). In the monocular case, for the pose refinement over three views in each camera, a bundle adjustment is carried out where the poses of the middle and last view are refined along with the 3D points, wherein the poses are in the first view coordinate frame that is fixed at identity. The initial estimate for the poses is obtained as the result of the 5-point RANSAC method as described above. In the above example, the middle view pose has been obtained by resection using the 3D-2D correspondences, where the 3D points have been obtained by triangulation between first and last views. Also the reprojection error in the middle view has been used to select the best pose solution out of the multiple pose solutions from the 5-point method.

In the bundle adjustment process, the error for each image point in each view is a robust function of the reprojection error. In particular, the reprojection error of the i'th point in the j'th view is, $e_{ij}=x_{ij}-h(P_j X_i)$, where $x_{ij}$ is the inhomogeneous image coordinates of the feature point, $P_j$ is the pose matrix, and $X_i$ is the 3D point in homogeneous coordinates. Function h is the conversion from homogeneous into inhomogeneous coordinates. The robust function of the error is $\log(1+\|e_{ij}\|^2/s^2)$, where s is the scale parameter of the Cauchy density determined by the user.

In the stereo case, for the pose refinement of the left stereo view in each camera, a robust function of the reprojection error in the new left and right views is used as the objective function, and a 3D point cloud is obtained by stereo triangulation of the previous left and right views with known poses. The initial estimate for the new left and right views is obtained by the 3-point RANSAC method described above.

As shown in FIG. 6, the pose refinement system and method is generalized in the multi-camera system and the polishing is distributed across cameras in the following way:
a) for each camera, the optimized pose hypothesis (i.e., the hypothesis having the highest global score) is refined not only on the camera from which it originated but also on all the cameras after it is transferred. Then, the global scores of the refined hypotheses in each camera are computed and the best cumulative scoring polished hypothesis is determined. This pose hypothesis is stored in the camera from which it originated (or it is transferred if the best pose comes from a different camera than the original). The refinement process is repeated for all the cameras in the system, resulting in each camera having a refined pose hypothesis. As a result, the process allows for the scenario where a given camera pose is more effectively refined by a camera other than the one in which it originated. Finally, the pose hypothesis which has the highest global score, is selected and applied to the system.

According to an embodiment of the present invention, the Visual Odometry Module 20 can be configured to compare the global scores at the end of the refinement process or after every iteration of the refinement process, by computing the optimized pose hypothesis and transferring it to all the cameras for the next iteration. It is noted, that in the description below, the pose hypotheses described above which are generated by the Visual Odometry Module 20 are referred to as "video-based pose hypotheses," for clarity in the discussion below of "landmark-based pose hypotheses."

As shown in FIG. 4, the Navigation System 1 comprises an Integration Module 30 which is communicatively connected to the Visual Odometry Module 20 and one or more Secondary Measurement Sensors 35. In order to increase the robustness of the Navigation System 1, the Secondary Measurement Sensors 35 (e.g., a Microelectromechanical (MEMS) Systems such as an IMU and/or a GPS unit) provides position measurement data (e.g., 3D acceleration and angular rate measurements captured by an IMU and/or a positioning reading captured by GPS) to the Integration Module 30 for integration with the video-based pose hypotheses generated by the Visual Odometry Module 20. According to an embodiment of the present invention, the Integration Module 30 can be comprised of an Extended Kalman Filter (EKF) framework. In this framework, a constant velocity and a constant angular velocity model are selected for the filter dynamics. The state vector consists of 13 elements: X, (3-vector) representing position in navigation coordinates, q, unit quaternion (4-vector) for attitude representation in navigation coordinates, v, (3-vector) for translational velocity in body coordinates, and ω, (3-vector) for rotational velocity in body coordinates. Quaternion representation for attitude has several practical properties. Each component of the rotation matrix in quaternion is algebraic, eliminating the need for transcendental functions. It is also free of the singularities that are present with other representations and the prediction equations are treated linearly. Based on this, the process model is represented as follows:

$$X_k = X_{k-1} + R^T(q_{k-1})x_{rel}$$

$$q_k = q_{k-1} \otimes q(\rho_{rel})$$

$$\omega_k = \omega_{k-1} + n_{\omega,k-1}$$

$$v_k = v_{k-1} + n_{v,k-1}$$

where $$x_{rel} = v_{k-1}\Delta t_k + n_{v,k-1}\Delta t_k$$

$$\rho_{rel} = \omega_{k-1}\Delta t_k n_{\omega,k-1}\Delta t$$

and $\otimes$ is used to denote the quaternion product operation; $\rho$ is the rotation vector (representing the rotation axis) in the body frame; R(q) is the rotation matrix determined by the attitude quaternion q in the navigation frame; and q($\rho$) is the quaternion obtained from the rotation vector $\rho$. Undetermined accelerations in both translational and angular velocity components are modeled by zero mean white Gaussian noise processes $n_{v,k}$ and $n_{\omega,k}$. The filter runs at the frame rate, meaning that the discrete time index denoted by k corresponds to the frame times when pose outputs are also available from visual odometry system.

According to an embodiment of the present invention, the angular rate sensor (gyro) and accelerometer readings from the IMU are used directly as measurements in the Integration Module 30. The multi-camera visual odometry frame to frame local pose measurements expressed in the coordinate frame of the front left camera, $P_k=P(t_k,t_{k+1})$, are also converted to velocities by extracting the rotation axis vector corresponding to the rotation matrix $R_k$, together with the camera translation given by $R^T T_k$, (where $P_k=[R_k; T_k]$) and then dividing by the timestep, $\Delta t_k=t_{k+1}-t_k$. Hence, the information from the Visual Odometry Module 20 and the IMU are used according to the following measurement model:

$$v_k^{vo}=v_k+n_{v,k}^{vo}$$

$$\omega_k^{vo}=\omega_k+n_{\omega,k}^{vo}$$

$$\omega_k^{imu}=\omega_k+n_{\omega,k}^{imu}$$

$$a_k^{imu}=R(q_k)g+n_{a,k}^{imu}$$

$$X_k^{gps}=X_k+n_k^{gps}$$

where $v_k^{vo}$ and $\omega_k^{vo}$ are translational and angular velocity measurements provided by the Visual Odometry Module 20 (vo); $w_k^{imu}$ and $a_k^{imu}$ are the gyro and accelerometers outputs provided by the IMU; $X_k^{gps}$ is the position measurement provided by the GPS unit; g is the gravity vector. Uncertainty in the video-based pose hypotheses, represented by the noise components $n_{v,k}^{vo}$ and $n_{\omega,k}^{vo}$, is estimated based on the reprojection error covariance of image features through backward propagation.

The gyro noise errors are modeled with fixed standard deviation values that are much higher than those corresponding to the visual odometry noise when the pose estimates are good (which is most often the case) and are comparable in value or sometimes much less when vision based pose estimation is difficult for brief durations. This allows the Integration Module 30 (i.e., the EKF) to effectively combine the two measurements at each measurement update, relying more on the sensor with the better noise characteristics. During the filter operation, bad measurements from all sensors (i.e., the cameras, the IMU, and the GPS unit) are rejected using validation mechanisms based on Chi-square tests on the Kalman innovations. In addition, those measurements from the Visual Odometry Module 20 causing large accelerations are also discarded. In order to obtain the initial position and attitude of the camera in navigation coordinates, first roll and pitch outputs from the IMU are used directly, and heading is obtained by the aid of the first two GPS readings that are sufficiently spread apart.

In certain circumstances, there may be a high degree of agreement between the angular velocities computed by visual odometry alone and those available from the gyros. However, if the gyro angular velocity measurements are used alone, e.g., by removing the second equation from the above measurement model, then a very large drift in the overall trajectory is observed. As such, although when viewed on a graph, the difference between the angular velocities at each time instant is small (at those times when visual odometry is working efficiently), and the errors due to the gyro bias add up quickly over time. On the other hand, visual odometry trajectory is very accurate except for brief regions where it might "break" causing gross errors in the global sense. It is during these "breaks" that it is optimal to integrate position measurement data from the one or more Secondary Measurement Sensors 35.

To avoid corrupting the visual odometry measurements at times when the process is operating efficiently, the difference in velocities in all three rotation-axes is computed at each time instant and compares to a threshold. If this difference in all axes is smaller than the threshold, then the third equation of the measurement model set forth above is removed. This also serves as a double check on the quality of the visual odometry output, meaning that if it is close to the gyro output we choose the visual odometry alone. Therefore, in those cases, the uncertainty in the visual odometry estimate computed by the backpropagation method described above is much smaller than the gyro, thereby making the Kalman gain on the gyro much smaller. By using the above approach, corruption from the IMU may be eliminated at those instances. Further, by selecting process model noise covariances that are high, the filter essentially passes the visual odometry outputs untouched, replacing the constant velocity based prediction.

Following integration of the IMU and GPS (Secondary Measurement Sensors 35) with the video-based pose estimation produced by the Visual Odometry Module 20, the Integration Module 30 generates a refined pose estimation. The refined pose estimation is passed from the Integration Module 30 to the Landmark Matcher 50. Although the refined pose estimation provided by the Integration Module 30 is highly accurate, it may, in certain circumstances, include drift from the true trajectory due to accumulation of errors over time. Therefore, a global landmark-based recognition and route correction for multi-camera visual odometry framework comprising the Landmark Extractor 40 and the Landmark Matcher 50) is provided that integrates visual landmark recognition techniques to correct any accumulated drift errors, as illustrated in FIG. 7.

Figure 7:
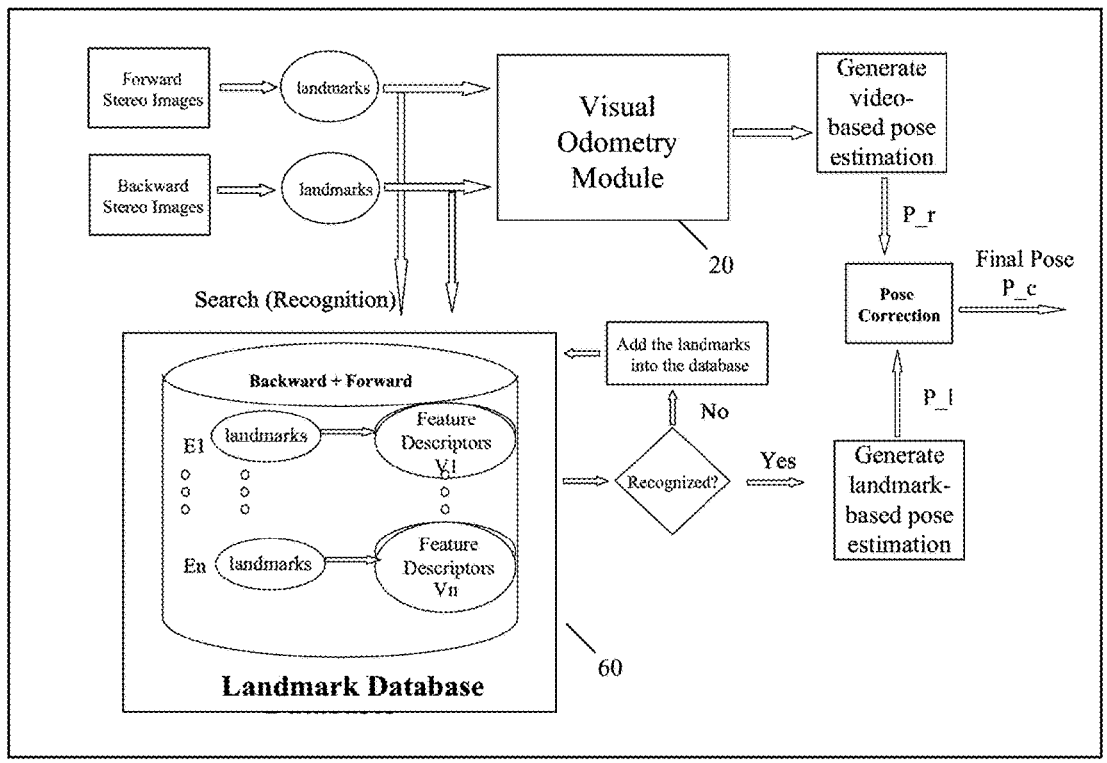
FIG. 7 illustrates a function flow diagram related to a global landmark-based pose estimation system and process, according to an embodiment of the present invention.

As shown in FIG. 7, given a time stamp t, the first step of the proposed algorithm is to detect and track a set of natural landmarks from the images of the forward and backward stereo pairs individually. Subsequently, with the use of the extracted landmarks, the proposed multi-stereo camera based pose estimation technique is activated to estimate the video-based pose estimation (P_r). Simultaneously, the extracted landmarks from both stereo pairs at the current time stamp (t) are used to search the landmark database for their most similar landmarks via the efficient database matching technique described in detail below. Once a set of similar landmarks is returned, a new "landmark-based pose estimation" (P_I) is estimated by comparing the current image position of the one or more landmarks with the 3D location stored in the database. The drift error accumulated in the video-based pose estimation P_r is corrected by the landmark-based pose estimation P_I to obtain a "final pose estimation" (P_c). Note if the matched landmarks are not found in the database then the new landmarks are added to the Landmark Database 60 dynamically.

Figure 8:
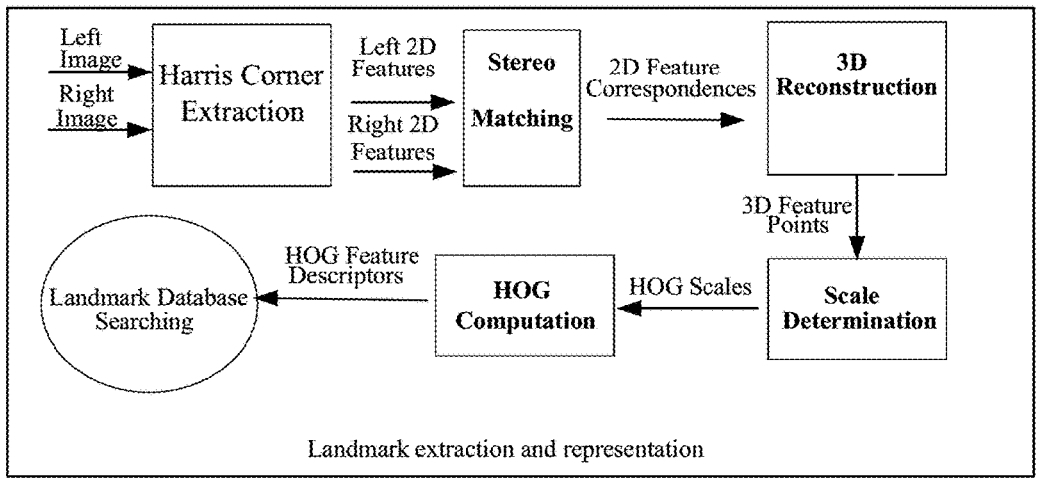
FIG. 8 illustrates a landmark extraction system and method, according to an embodiment of the present invention.

FIG. 8 illustrates an exemplary flowchart of the steps performed by the Landmark Extractor 40 based on a pair of stereo images at each time t, according to an embodiment of the present invention. According to an embodiment of the present invention, the Landmark Extractor 40 is configured to perform Harris Corner extraction—wherein given a pair of stereo images at time t, a set of natural feature points are detected from the images. The Harris corner detector is utilized to automatically extract a set of feature points from the left and right images respectively, as described in detail in U.S. patent application Ser. No. 11/833,498, titled "A Stereo-Based Visual Odometry Method and System," by Zhu et al., filed Aug. 3, 2007 (herein the '498 Application), the entire disclosure of which is hereby incorporated by reference herein. Advantageously, the Harris corners are relatively stable under small to moderate image distortions, as described in the '498 Application.

The Landmark Extractor 40 is further configured to perform a stereo matching process, wherein once the feature points are extracted, a stereo matching algorithm is activated to find correspondences among the extracted feature points between left and right images. The 3D coordinates of each feature point are subsequently computed by triangulation using the feature correspondences. The estimated 3D feature points serve as the landmarks for the stereo pair.

After the landmarks are detected from the stereo pair, the HOG descriptor is computed from the left image of the stereo pair to represent each landmark. According to an embodiment of the present invention, instead of computing the HOG descriptor with a fixed scale to select the image patch size, the scale S of the HOG descriptor for each landmark is determined automatically via the following equation:

$$S = S_{ref} \times \frac{Z_{ref}}{Z}$$

where Z is the depth or the coordinate in the Z direction of the landmark, and $S_{ref}$ is scale used for the landmark whose depth is equal to $Z_{ref}$. According to an exemplary embodiment, $S_{ref}$ may be set to 1 and $Z_{ref}$ is set to 10 meters heuristically. Therefore, the closer the landmark, the larger the scale will be given. Once the depth-dependent HOG descriptor is computed, each landmark is associated with the 2D coordinates, 3D correspondences and a HOG descriptor (i.e., either a fixed scale or depth-dependent scale HOG descriptor).

As described above, each image is represented by a set of extracted landmarks with the HOG descriptors. Given two images taken at different locations, the Landmark Matcher 50 is configured to match the extracted landmarks between them using the HOG descriptors. According to an embodiment of the present invention, the landmark matching process comprises, for each landmark in the first image, search all the landmarks in the second image for its correspondence. The search is based on the cosine similarity score of the HOG descriptors between two landmarks. A landmark in the second image that produces the highest similarity score is considered as a potential match for the landmark in the first image. At the same time, for each landmark in the second image, a potential match in the first image can also be assigned automatically with the one that produces the highest similarity score. Finally, only the pairs that mutually have each other as the potential matches are accepted a valid match.

According to an embodiment of the present invention, the landmark matching process may further comprise the use of epipolar geometry constraints to eliminate the false matches. Specifically, from the obtained matches between two images, a fundamental matrix F is first estimated via the robust RANSAC technique described in detail in the '498 Application. Subsequently, based on the estimated fundamental matrix F, those matches that produce residuals that are larger than a predefined threshold value are treated as false matches and discarded.

Figure 3:
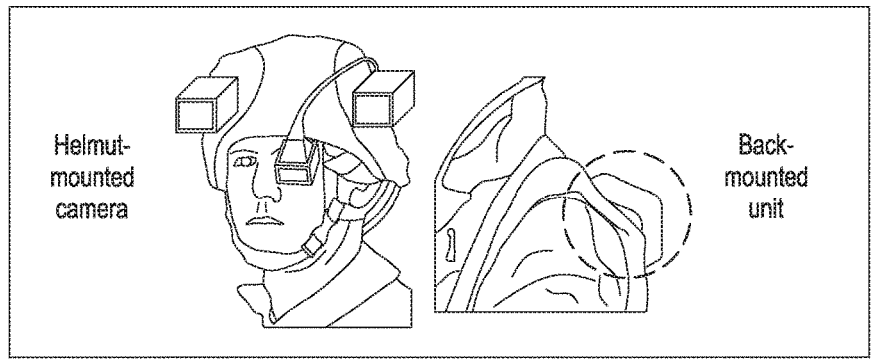
FIG. 3 shows a prototype vision-based navigation system that can be worn by a user, according to an embodiment of the present invention.
Figure 4:
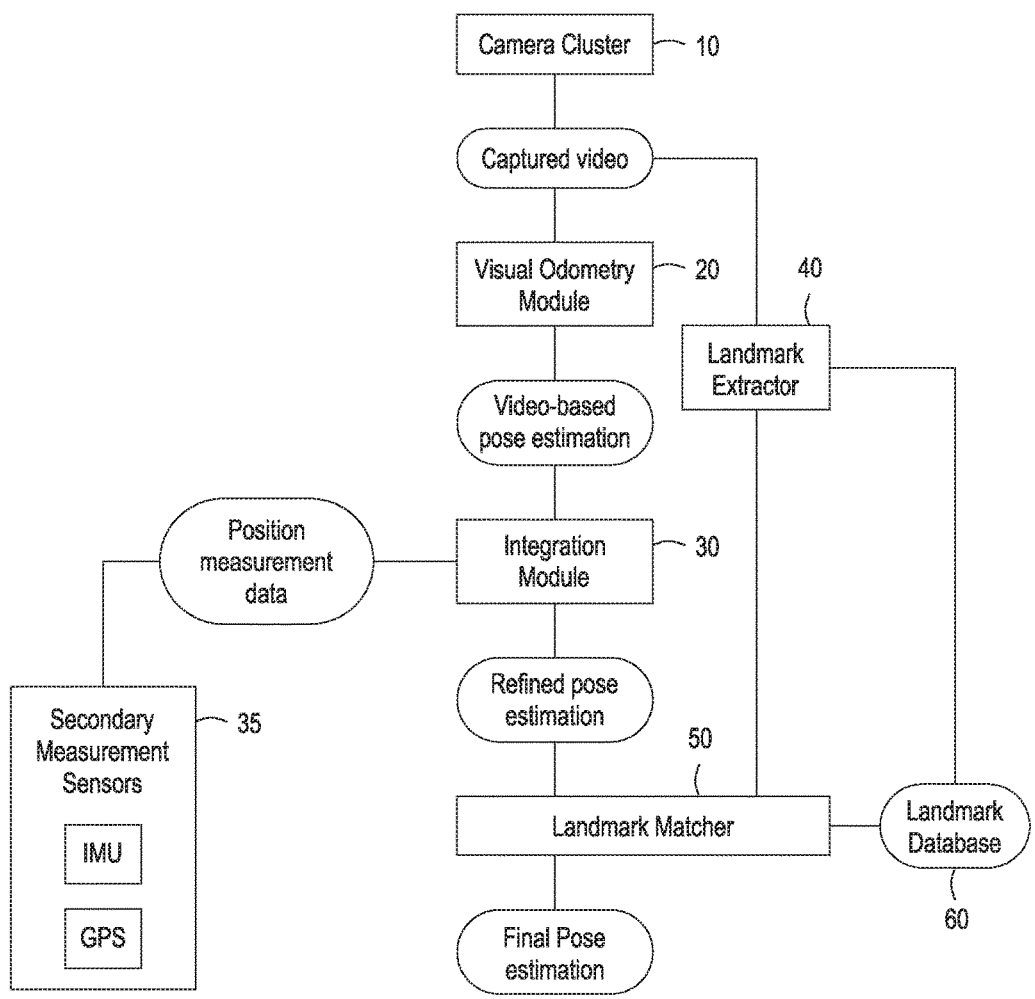
FIG. 4 shows a vision-based navigation system and functional flow diagram, according to an embodiment of the present invention.

As illustrated in FIG. 3, the Landmark Matcher 50 (and optionally, the Landmark Extractor 40) is communicatively connected to the Landmark Database 60. In operation, during navigation, the local scene information at one particular point along the route is captured by the raw images or "video snapshots" taken by the plurality of video cameras. For simplicity, a unique set of representative landmarks is extracted from the images to represent the scene at each location along the route dynamically. Therefore, instead of inserting the raw images of the scene at each location into a database directly, all the extracted landmarks from the scene are added to the Landmark Database 60.

As a result, the Landmark Database 60 comprises a list of video snapshots of the landmarks extracted from the scene at each location along the route during navigation. Since each landmark is represented by a distinctive HOG descriptor, the combination of HOG descriptors with the spatial configuration data (i.e., 2D and 3D coordinate data) of the landmarks creates a distinctive "landmark snapshot" which serves as the fingerprint of the location and landmark. Each landmark snapshot is composed of the 2D coordinates, 3D coordinates and HOG descriptors of the landmarks, and, optionally, the estimated 3D camera location.

According to an embodiment of the present invention, the Landmark Database 60 serves as the "memory" of all the places that the user traveled. Accordingly, when the user arrives at a new location, the extracted landmarks from the scene are utilized to search the Landmark Database 60 to decide whether the new location has been visited before. Since the size of the Landmark Database 60 increases rapidly as the travel continues, an efficient database searching strategy is needed, as is described below.

According to an embodiment of the present invention, an efficient hierarchy database searching strategy is provided which comprises the following steps, each of which are described in detail below: 1) landmark match candidate selection comprising the use of geo-spatial constraints; 2) candidate pruning comprising the use of a 3D landmark spatial distribution process; and 3) HOG-based landmark matching comprising the use of chronological constraints.

According to an embodiment of the present invention, candidate landmark matches are selected using geo-spatial constraints. In operation, when the user travels to a new location, based on its estimated 3D location, a geo-spatial search region is obtained. Subsequently, with the use of the geo-spatial search region, an initial set of candidate landmark snapshots is obtained quickly from the Landmark Database 60 and stored in a temporary memory, herein referred to as a landmark candidate cache.

Since the number of selected candidates in the landmark candidate cache is determined and limited by the size of the geo-spatial search region, which is typically small, the large-scaled Landmark Database 60 (which may include thousands or more entries) to a small candidate cache (e.g., several hundred candidates) during the landmark database searching process. Optionally, according to an embodiment of the present invention, the geo-spatial search region can be set to be sufficiently large and it can automatically vary with the drift rate or uncertainty.

Figure 9:
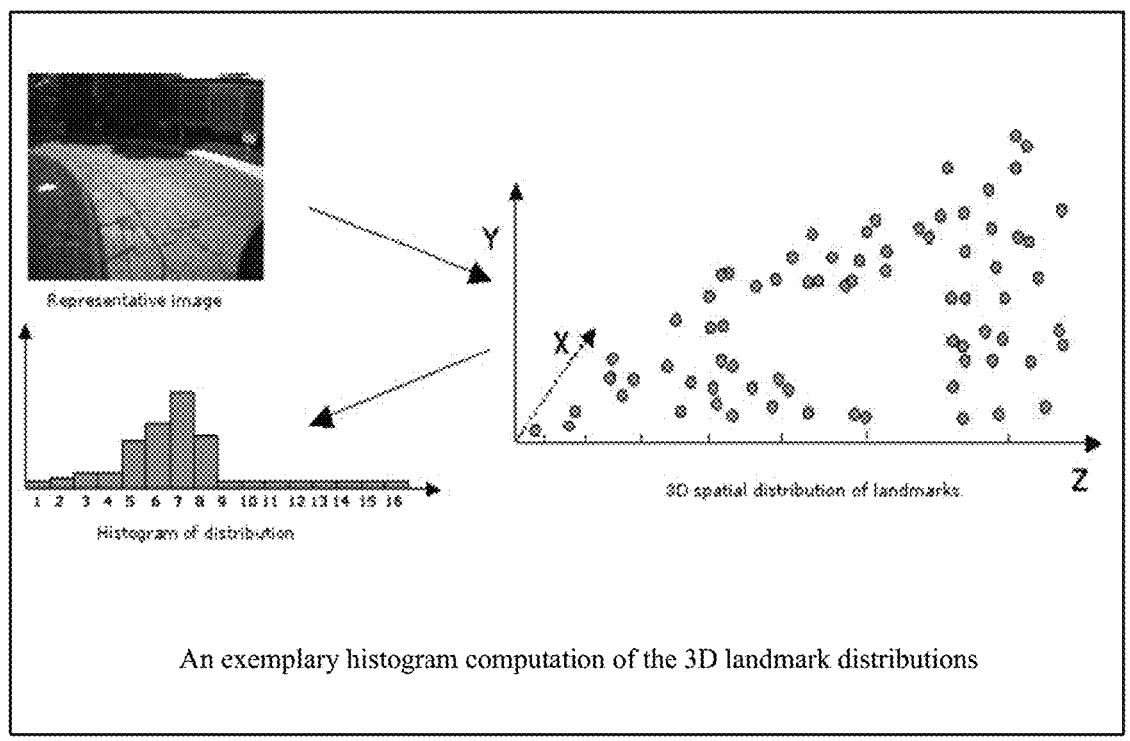
FIG. 9 illustrates an exemplary histogram computation of 3D landmark distributions generated according to an embodiment of the present invention.

Next, the initial set of candidate landmark snapshots is pruned or reduced to identify a refined set of candidate landmark snapshots, according to an embodiment of the present invention. Typically, the 3D spatial distribution of the landmarks extracted from the scene varies with the locations along the route. Therefore, a histogram vector is computed to characterize the 3D spatial distribution of the landmarks at each snapshot in the landmark candidate cache. For example, according to an embodiment of the present invention, the histogram vector can consist of 16 bins, wherein each bin counts the number of landmarks distributed in the space determined by the depth information, as illustrated in FIG. 9.

Next, the histogram vector of 3D landmark distributions of the current landmark snapshot is used to compare with each candidate in landmark candidate cache. Finally, a smaller candidate cache (usually less than one hundred or none) can be obtained by discarding those candidates with low level of similarities.

Once a smaller candidate cache is obtained, a HOG descriptor-based landmark matching process is activated to search the candidate cache to identify the optimized candidate landmark snapshot. In operation, since the same environment/target scene may be visited several times, there may be several snapshots of the landmarks associated with the environment/target scene. According to embodiments of the present invention, the landmark matching process may terminate when it identify the first match or may continue until it identifies the most 'similar' landmarks. Optionally, a chronological constraint may be integrated into the process to further expedite the search. Specifically, the candidate landmark snapshots can be first ranked according to the time they are captured. Once the candidate landmark snapshot that satisfies the similarity measurement is returned (i.e., the optimized candidate landmark snapshot), the search termites, and the optimized candidate landmark identified and returned.

As described above, according to an embodiment of the present invention, the Landmark Matcher 50 can be configured to perform a global landmark-based pose correction to generated a final pose estimation. In operation, once a landmark snapshot is returned from the Landmark Database 60, it may mean that the user is visiting an environment/target scene that has been visited previously. As a result, with the use of recognized landmarks serving as the reference points, a new pose Pr of the visual odometry system at the current position can be recomputed directly. It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer implemented landmark recognition method comprising:
    capturing a pair of stereo images comprising a view of one or more landmarks obtained by each of a plurality of cameras, where each camera in the plurality of cameras has different position measurement data comprising location, depth and pose as compared to position measurement data of each other camera;
    computing a descriptor for each of the one or more landmarks based on the pair of stereo images;
    computing a landmark snapshot for each landmark of the one or more landmarks in the pair of stereo images, the landmark snapshot comprising the descriptor for the landmark combined with a spatial configuration for the landmark; and
    comparing between the landmark snapshot for each of the one or more landmarks in the pair of stereo images to identify corresponding landmarks in the pair of stereo images.

2. The method of claim 1, generating a set of pose hypotheses for each camera in the plurality of cameras based on randomly selected three-point correspondences over two views of a corresponding camera in the plurality of cameras.

3. The method of claim 1, wherein the descriptor is a scale identifier.

4. The method of claim 3 wherein the scale identifier is a fixed scale identifier.

5. The method of claim 3 wherein the scale identifier is a depth-dependent scale identifier.

6. The method of claim 1 further comprising:
    scoring a set of pose hypotheses generated for each camera based on a comparison within a local dataset of point correspondences for each camera within the plurality of cameras to produce a set of intra-camera scores; and
    identifying an optimized video-based pose hypothesis for each camera based on an evaluation of a set of global scores generated by transferring the set of pose hypotheses generated for each camera to other cameras and producing a set of inter-camera score.

7. The method of claim 6, further comprising integrating the set of pose hypotheses with the position measurement data.

8. The method of claim 7 wherein the integrating comprising performing a Kalman filtering operation on the position measurement data and the set of pose hypotheses.

9. The method of claim 6, further comprising determining positional measurement data using an inertial measurement unit (IMU).

10. The method of claim 6, further comprising determining positional measurement data using a global positioning system (GPS).

11. The method of claim 6, further comprising refining the identified landmark matches by estimating a fundamental matrix using a RANSAC method, and based on the fundamental matrix discarding one or more matches that produce a residual that is higher than a predefined threshold value.

12. The method of claim 11, generating the set of pose hypotheses based on randomly selected five-point correspondences over three views of each camera within the plurality of cameras using local camera data corresponding to each camera.

13. The method of claim 11, generating the set of pose hypotheses based on randomly selected five-point correspondences over three views using data from the plurality of cameras.

14. The method of claim 1 wherein the comparing between the landmark snapshot further comprises:
    determining correspondence of two-dimensional features in the landmark snapshot for each of the one or more landmarks in the pair of stereo images for reconstructing three-dimensional coordinates for the two-dimensional features;
    determining scale for each descriptor that is proportional to a distance between each camera within the plurality of cameras and the landmark snapshot associated with each camera; and
    comparing a cosine similarity score of the descriptor to determine if one or more landmarks correspond.

15. The method of claim 1 further comprising:
    pruning the landmark snapshot for each of the one or more landmarks to identify a refined set of candidate landmark snapshots; and
    computing a histogram vector corresponding to a spatial distribution of the landmarks in each landmark snapshot.

16. The method of claim 15, further comprising ranking the refined set of candidate landmark snapshots according to time of capture.

17. The method of claim 2, wherein a 3D point cloud determined by stereo triangulation is used to generate the set of pose hypotheses.

18. An apparatus for landmark recognition comprising:

a plurality of cameras that capture a pair of stereo images comprising a view of one or more landmarks obtained by each of the plurality of cameras, where each camera in the plurality of cameras has different position measurement data comprising location, depth and pose as compared to position measurement data of each other camera;

one or more processors, coupled to the plurality of cameras; and one or more storage devices with executable instructions stored thereon that when executed by the one or more processors perform a method comprising:

computing a descriptor for each of the one or more landmarks based on the pair of stereo images;

computing a landmark snapshot for each landmark of the one or more landmarks in the pair of stereo images, the landmark snapshot comprising the descriptor for the landmark combined with a spatial configuration for the landmark; and comparing between the landmark snapshot for each of the one or more landmarks in the pair of stereo images to identify corresponding landmarks in the pair of stereo images.

19. The apparatus of claim 18, wherein the method further comprises:

scoring a set of pose hypotheses generated for each camera based on a comparison within a local dataset of point correspondences for each camera within the plurality of cameras to produce a set of intra-camera scores; and identifying an optimized video-based pose hypothesis for each camera based on an evaluation of a set of global scores generated by transferring the set of pose hypotheses generated for each camera to other cameras and producing a set of inter-camera score.

20. The apparatus of claim 19, wherein the method further comprises refining the identified landmark matches by estimating a fundamental matrix using a RANSAC method, and based on the fundamental matrix discarding one or more matches that produce a residual that is higher than a predefined threshold value.

* * * * *